United States Patent [19]

Harrison et al.

[11] 4,306,053

[45] Dec. 15, 1981

[54] OIL AND WATER RESISTANT POLYURETHANE RESIN AND POLYOL COMPOSITION USEFUL TO MAKE THE SAME

[75] Inventors: John A. Harrison, Hudson, Wis.; Chung I. Young, Roseville, Minn.; Stewart P. Lee, Van Nuys, Calif.

[73] Assignee: Minnesota Mining and Manufacturing Company, Saint Paul, Minn.

[21] Appl. No.: 131,092

[22] Filed: Mar. 18, 1980

[51] Int. Cl.$^3$ .............................................. C08G 18/50
[52] U.S. Cl. ...................................... 528/77; 252/182
[58] Field of Search ...................... 521/171; 252/182; 528/77

[56] References Cited

U.S. PATENT DOCUMENTS

| | | | |
|---|---|---|---|
| 2,915,496 | 12/1959 | Swart et al. | 260/45.7 |
| 3,012,987 | 12/1961 | Ansul | 428/425 |
| 3,219,634 | 11/1965 | Watson et al. | 528/60 |
| 3,245,957 | 4/1966 | Hindersinn et al. | 521/123 |
| 3,252,922 | 5/1966 | Degener et al. | 521/171 |
| 3,255,126 | 6/1966 | Fuzesi et al. | 521/171 |
| 3,260,687 | 7/1966 | Postol | 521/171 |
| 3,412,048 | 11/1968 | Mercer et al. | 521/169 |
| 3,419,532 | 12/1968 | Jackson | 521/171 |
| 3,541,183 | 11/1970 | Kallert et al. | 528/83 |
| 3,792,003 | 2/1974 | Duchesne | 149/19 |
| 3,878,157 | 4/1975 | Olstowski et al. | 260/33.8 UB |
| 3,933,725 | 1/1976 | Dearlove et al. | 260/33.6 UB |
| 3,980,579 | 9/1976 | Syrop et al. | 252/182 |

*Primary Examiner*—Maurice J. Welsh
*Attorney, Agent, or Firm*—Cruzan Alexander; Donald M. Sell; Richard Francis

[57] ABSTRACT

Polyurethanes resistant to swelling in water and oil, particularly cooking oils, are derived from the polymerization of organic polyisocyanate and a novel polyol composition comprising hydroxyl-terminated poly(haloalkylene ether) and hydroxyl-terminated halogen-free aliphatic compound.

20 Claims, 1 Drawing Figure

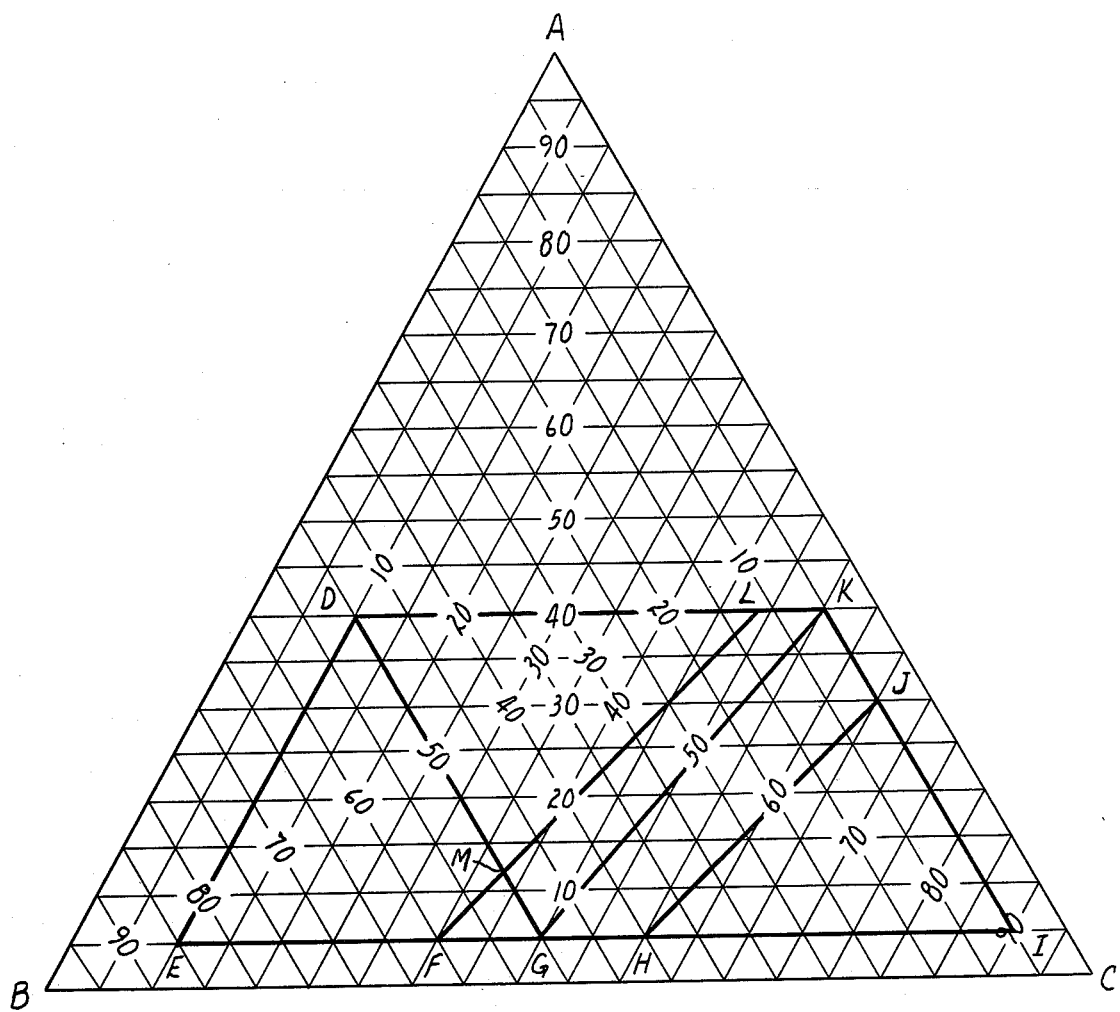

OIL AND WATER RESISTANT POLYURETHANE RESIN AND POLYOL COMPOSITION USEFUL TO MAKE THE SAME

BACKGROUND OF THE INVENTION

1. Field of the Invention

This invention relates to polyurethane compositions, and more particularly, to polyurethane compositions which are resistant to swelling in oil and/or water. The invention also relates to a novel polyol composition useful to make the polyurethane composition.

2. Prior Art

Polyurethane resins have been prepared for a number of years by the reaction of organic polyols and other similar reactive compounds, diisocyanates and optionally chain extending agents. By the appropriate selection of precursor components, the physical characteristics of the cured polyurethane resins may be varied from soft elastomers to hard, even brittle, materials that may be soluble either in organic solvents or water. It is also known that with increased cross-linking of such polymers, generally by increasing the concentration of components having more than two functional groups, the softening point and modulus of such polymers are increased with a corresponding reduction in the elongation and swelling in solvents. Such modifications are discussed in Saunders and Frisch, *Polyurethanes, Chemistry and Technology*, Part I, pages 264 and 320, Interscience Pub. (1963).

Polyurethanes cross-linked by use of polyols having two or more hydroxyl groups are disclosed, for example, in U.S. Pat. Nos. 2,915,496; 3,012,987; 3,541,183; 3,792,003 and 3,933,725. No teaching can be found in any of these patents of substantially non-swelling polyurethane compositions. The term "substantially non-swelling" as herein used means, after immersion in oil or water at ambient temperature, e.g., 20° C.-25° C., and for a prolonged period of time, e.g., at least one week, a polyurethane sample will have a volume change of less than about 3%, preferably less than 1.0%.

Polyurethanes have also been prepared using halogen-containing polyether polyols to provide flame resistance to articles manufactured therefrom and are disclosed in many patents, including, for example U.S. Pat. Nos. 3,245,957; 3,252,922; 3,255,126; 3,260,687; 3,412,048 and 3,878,157 (also U.S. Pat. Nos. 3,879,329; 3,929,709; 3,956,221; 3,965,073 and 3,996,172 which are related to U.S. Pat. No. 3,878,157). Of these patents, U.S. Pat. Nos. 3,260,687; 3,412,048 and the family of patents of which U.S. Pat. No. 3,878,157 is parent, disclose compositions, from which the polyurethane is prepared, to contain polyols having three or more hydroxyl groups. None of these patents or other reference of which applicants are aware describe polyurethane resins prepared from halogen-containing polyether polyols, polyols having three or more hydroxyl groups, and polyisocyanates in the concentrations necessary to provide products which are substantially non-swelling in oil and water.

Polyurethanes substantially impermeable to solvents such as petrol and fuel oils are disclosed in U.S. Pat. No. 3,219,634. These polymers have been prepared by curing a mixture of a cross-linking agent and an isocyanate terminated polyurethane prepolymer based on polyepichlorohydrinpolyol. U.S. Pat. No. 3,219,634 teaches that polyurethanes can be made from prepolymers based on polyepichlorohydrinpolyol that has been mixed with non-halogen-containing polyetherpolyol (Col. 3, lines 30-37). Amounts of non-halogen-containing polyetherpolyol that can be used are however not disclosed. Examples 5 and 6 of U.S. Pat. No. 3,219,634, however, illustrate polyurethanes containing no less than 54 and 43 mole percent of polyepichlorohydrin polyol, respectively. Such polyurethanes, although resistant to fuel oils, are not resistant to softening on prolonged contact with water.

SUMMARY OF THE PRESENT INVENTION

In accordance with the present invention, polyurethanes are disclosed that are substantially non-swelling in water and oil, particularly cooking oil, (i.e., glycerides of long chain fatty acids) and resist softening on contact with oil and water. Such polyurethanes comprise the reaction product of:

(1) organic polyisocyanate; and
(2) a novel polyol composition comprising
  (a) hydroxyl-terminated poly(haloalkylene ether) having a number average molecular weight of about 500 to 5000; and
  (b) hydroxyl-terminated halogen-free aliphatic compound having a number average molecular weight of about 32 to 6000.

The hydroxyl equivalents in the hydroxyl-terminated compounds (both the poly(haloalkylene ether) and the halogen-free aliphatic compound) and the isocyanate equivalents in the organic polyisocyanate provide an NCO:OH ratio of about 0.8:1 to about 1.4:1, preferably about 1.2:1 to 1.4:1. The hydroxyl-terminated poly(haloalkylene ether) provides a 5 to 40% of the total hydroxyl equivalents and the hydroxyl-terminated halogen-free aliphatic compound provides correspondingly 90 to 60% of the total hydroxyl equivalents. About 5 to 75% (preferably 5 to 50%) of the total hydroxyl equivalents of the hydroxyl-terminated compounds have 3 to 6 or more hydroxyl groups. About 10 to 90% (preferably about 10 to 65%, more preferably about 10 to 55% and most preferably 10 to 50%) of the hydroxyl groups present in the hydroxyl-terminated compounds have 1 or 2 hydroxyl groups of which no more than 25% have only 1 hydroxyl group. At least 25% by weight of the hydroxyl-containing compounds have a molecular weight of at least about 500.

THE DRAWING

The composition of the novel polyol composition useful to make the oil-resistant polyurethanes of the invention is more precisely understood by reference to the FIGURE of the drawing wherein A, B and C are the apexes of a triangular coordinate graph in which A represents 100% on an equivalent basis, hydroxyl-terminated poly(haloalkylene ether), B represents 100% on an equivalent basis polyol having 3 to 6 hydroxyl groups, and C represents 100%, on an equivalent basis, polyol having 1 or 2 hydroxyl groups and no halogen. The boundary DEIK encloses polyol compositions which provide polyurethanes having Shore A hardness that does not decrease more than 30% on prolonged contact with water and an oil swell of less than 2%, the boundary DEHJK an oil swell of less than 1%, the boundary DEGK an oil swell of less than 0.5%, and the boundary DEFL an oil swell of less than 0.2%. The very most preferred polyol composition which provides polyurethanes having Shore A hardness that does not decrease more than 30% on prolonged contact (at least 158 days) with water, an oil swell of less than 0.2% and also a water swell of less than 2% is represented by the area bound by LDM.

While the boundaries described above are shown on the graph in the drawing as being definite straight lines, the lines actually represent applicants' approximation of boundary zones which may extend up to about 3% on either side of the lines shown.

DETAILED DESCRIPTION OF THE INVENTION

The curable mixture of the present invention as defined above, simply stated, comprises organic polyisocyanates and a polyol composition comprising hydroxyl group-containing compounds of which 5 to no more than 40% of the hydroxyl groups are present in halogen-containing compounds and 5 to 85% of the hydroxyl groups are present in compounds having 3 to 6 or more hydroxyl groups. The composition may also contain various other adjuvants to provide particular characteristics to the cured products prepared therefrom.

Suitable hydroxyl-terminated poly(haloalkylene ether) compounds are the condensation products obtained by the reaction of one or more initiator compounds that have one or more active hydrogens [as determined by the Zerewitinoff method, J. Am. Chem. Soc. 49, 3181 (1927)] with a haloaliphatic epoxide in the presence of a Lewis acid-type catalyst in accordance with methods such as are described in U.S. Pat. No. 2,581,464.

Compounds suitable for use as initiators in the preparation of hydroxyl-terminated poly(haloalkylene ether) compounds include, for example, compounds such as methanol, ethanol, propanol, butanol, ethylene glycol, propylene glycol, butylene glycol, neopentyl glycol, diethylene glycol, triethylene glycol, 1,6-hexanediol, 1,4-cyclohexanediol, 1,4-cyclohexanedimethanol, glycerine, trimethylolpropane, pentaerythritol, dipentaerythritol, sorbitol, mixtures thereof and the like.

Suitable haloaliphatic epoxides for use in the preparation of the hydroxyl-terminated poly(haloalkylene ether) compounds include, for example, 3-chloro-1,2-epoxypropane (epichlorohydrin), 3-chloro-1,2-epoxybutane, 3-chloro-2,3-epoxybutane, 3,3-dichloro-1,2-epoxypropane, 3,3,3-trichloro-1,2-epoxypropane, 3-bromo-1,2-epoxypropane, 1,1-dichloro-1-fluoro-2,3-epoxypropane, 1-chloro-1,1-difluoro-2,3-epoxypropane, 1-bromo-1,1-dichloro-2,3-epoxypropane, and 1,1,1,2,2-pentachloro-3,4-epoxybutane. The preferred halogen substituents are fluorine, chlorine and bromine.

Preferably, the hydroxyl-terminated poly(haloalkylene ether) compounds of use in the composition of the invention are the reaction products of an aliphatic hydroxy compound, e.g., ethylene glycol, glycerine, etc., and epichlorohydrin in the presence of a catalyst comprising a fluorinated acid and a polyvalent tin compound in accordance with the teachings of assignee's copending U.S. patent application Ser. No. 76,557 filed Sept. 17, 1979 which is a continuation-in-part of Ser. No. 906,744 filed May 17, 1978, both now abandoned. Generally, from about 4 to 55 moles of epichlorohydrin is used per mole of aliphatic hydroxy compound initiator so as to provide hydroxy-terminated poly(haloalkylene ether)s having a molecular weight of about 500 to 5000.

Hydroxyl-terminated halogen-free aliphatic hydroxyl group containing compounds include non-oligomeric straight chain aliphatic and cycloaliphatic hydroxy compounds and hydroxyl-terminated oligomeric compounds, both oligomeric monools and polyols. Suitable non-oligomeric aliphatic hydroxyl compounds are the alkanols, glycols, and polyols having one to six hydroxyl groups that have been described above as initiators.

Suitable hydroxyl-terminated oligomeric compounds include any hydroxyl-terminated oligomeric compound having a number average molecular weight between about 500 and 6000 and a glass transition temperature ($T_g$) of less than 30° C. Examples of such oligomers include the hydroxy-terminated polyesters described in U.S. Pat. Nos. 3,641,199 and 3,457,326. Hydroxy-terminated lactone polyesters are described in U.S. Pat. No. 3,169,945 (especially the polyester formed by reaction of epsilon-caprolactone and a polyol). Hydroxy-terminated block polymers of polyethers and polyesters are described in U.S. Pat. No. 3,960,572. Polyalkylene ether polyols are described in U.S. Pat. Nos. 3,499,852, 3,697,485 and 3,711,444. Polyolefin polyols such as the polyethylene and polypropylene glycols are described in U.S. Pat. Nos. 3,850,770 and 3,678,014. Polysiloxane polyols are described in U.S. Pat. Nos. 3,886,865, 4,013,698, 4,098,742 and 4,130,708.

Particularly desirable commercially available hydroxy-terminated oligomeric compounds are the poly(oxypropylene) polyols sold by Union Carbide Corp. under the trademark "NIAX" such as "PPG 2000", a poly(oxypropylene) diol having an average molecular weight of about 2000; the polycaprolactone polyols such as "PCP 0230" and "PCP 0240" having an average molecular weight of 1250 and 2000, respectively, also sold by Union Carbide Corp.; the poly(oxytetramethylene) polyols sold by Wyandotte Chemicals Corp. under the trademark "POLYMEG" such as "Polymeg 1000" and "Polymeg 2000"; and the poly(oxyethylene) polyols sold by Union Carbide Corp. under the trademark "CARBOWAX" such as "Carbowax 2000".

Suitable organic polyisocyanates can be essentially any polyisocyanate, e.g., aliphatic polyisocyanates, aromatic polyisocyanates, heterocyclic polyisocyanates or mixtures thereof, with hydrocarbon polyisocyanates, i.e., polyisocyanates containing only carbon and hydrogen except for the nitrogen and oxygen of the isocyanate groups comprising an important class. Many such organic polyisocyanates are known in polyurethane art. Suitable polyisocyanates include arylene diisocyanates, such as p-phenylene diisocyanate, diphenyl diisocyanate and the like, alkarylene diisocyanates, such as toluene diisocyanate, 3,3'-dimethyl-4,4'-biphenylene diisocyanate and the like; alkylene diisocyanates, for example, ethylene diisocyanate, 1,4-tetramethylene diisocyanate, hexamethylene diisocyanate, and 2,2,4-trimethylhexane 1,6-diisocyanate; aralkylene diisocyanates, such as methylenebis(phenyl isocyanate); and alicyclic diisocyanates, for example, isophorone diisocyanate and methylcyclohexyl diisocyanate.

Other diisocyanates that can be employed are isocyanate-terminated adducts of diols such as ethylene glycol, 1,4-butylene glycol, polyoxyalkylene glycols, etc. These are formed by reacting two moles of a diisocyanate, such as those mentioned above, with one mole of a diol. Such polyfunctional isocyanates are well known (see U.S. Pat. Nos. 3,073,802 and 3,054,755). Representative examples of commercially available adducts are sold under the trademarks "Multrathane" by Mobay Chemicals and "Adiprene" by E. I. DuPont Nemours.

Also suitable are organic polyisocyanates having more than two isocyanate groups per molecule such as those sold under the trademarks "Mondur MRS" by Mobay Chemicals and "PAPI" by Upjohn Chemicals Co. A list of useful commercially available polyisocyanates is found in "Encyclopedia of Chemical Technology" by Kirk and Othmer, 2nd Ed., Vol. 12, pp. 46–47, Interscience Pub. (1967).

As described above, the polyisocyanate is used in an amount so as to provide with the hydroxyl group-containing components of the composition an NCO:OH ratio of about 0.8:1 to about 1.4 to 1. The ratio used generally depends on the wetness of the hydroxy group-containing components and fillers in the composition; the wetter the components and fillers, the greater the amount of isocyanate compound used.

The oil-resistant polyurethane resins of the invention are prepared by mixing by any suitable method the poly(haloalkylene ether)s, non-halogen-containing aliphatic hydroxyl group-containing compounds, and polyisocyanates, pouring the resulting liquid mixture into a mold, and curing the mixture. Although curing will take place without the addition of heat, it is generally preferred to heat the filled mold at temperatures from about 50° C. to 200° C. for from about five minutes to several hours to effect cure of the composition, after which the cured polyurethane can be removed from the mold. Generally, various adjuvants are added to the liquid mixture before effecting cure. Thus, catalysts can be added to accelerate the curing reaction and are especially desirable when aliphatic isocyanates are used in the mixture. Suitable catalysts include amine catalysts and organo metallic compounds, for example, trimethylamine, n-methylmorpholine, N,N,N',N'-tetramethyl-1,3-butane-diamine, 1,4-diazabicyclo(2.2.2) octane, dibutyltin dilaurate, dibutyltin dimethoxide, dibutyltin diethylmercaptive, stannous chloride, stannous octoate, dioctyltin diacetate, lead octoate, lead naphthenate, lead oleate, etc. Also useful are other known catalysts such as the tertiary phosphines, the alkali and alkaline earth metal hydroxides or alkoxides, the acidic metal salts of strong acids, salts of various metals, etc. These catalysts are well known in the art and are employed in catalytic quantities, for example, from 0.001 percent to about 5 percent, based on the weight of the reaction mixture. A particularly preferred catalyst is the catalyst system, comprising a metal halide and an organic epoxide, that is described in assignee's copending application Ser. No. 747,784, filed Dec. 6, 1976.

In addition to catalysts, if desired, there may be included in the composition to be cured such adjuvants as antioxidants, coupling agents, dyes, fillers, pigments, anti-static agents, flame-retardant agents, thickeners, viscosity modifiers, and the like within the scope of this invention. Such adjuvants are usually preblended with the hydroxy group-containing compounds prior to the curing step. Operational fillers include particulate, flake and fibrous natural and synthetic resins, particularly small denier fibers of nylon, rayon, cotton and polyester, carbon black, glass fibers, flakes, beads and microbubbles, clay, silica, alumina, magnesium silicate, Wisconsin loess, nepheline syenite, silicon carbide, phosphates, borates, diatomaceous earth, talc, kaolin, feldspar, barium sulfate, calcium carbonate, ground limestone, dolomite, titanium dioxide, iron oxide, umber, ochre, and the like. The adjuvants may be used in quantities up to about five parts or more per part of polyurethane. The fillers are preferably used in quantities on the order of 0.5 to 0.75 part per part of polyurethane. Coupling agents are preferably used in quantities on the order of 0.5 to 5% by weight based on the amount of filler, most preferably 0.5 to 1% by weight. The fillers can be further treated to achieve improved properties such as improved bonding of inorganic fillers to the polyurethane resin and improved resistance of the polyurethane to swelling by water. Examples include the treatment of inorganic fillers with coupling agents such as silica with hydrolyzable silanes, calcium carbonates with stearic acid, titanium dioxide treated with "Hi-Pflex 100" sold by Pfizer Chemical Co., and talc treated with a polysiloxane such as "Cyprubond" sold by Cyprus Industrial Minerals Co.

The cured polyurethane resins of the invention are particularly useful as a flooring product for restaurants where cooking oils and/or water are present and have caused swelling of other known flooring products rendering them unsuitable for this application. Other application for the resins of the invention include coatings for walls and various equipment that require protection from oils. The resins are also useful for product such as sealants, gaskets, seals, tubing, and valves where precise dimensions must be maintained in the presence of oils.

The following examples will aid in further explaining, but should not be deemed as limiting, the instant invention. In all cases, unless otherwise noted, all parts and precentages are by weight.

EXAMPLES 1–29

A stock mixture of oligomeric diol was prepared by mixing:

| Parts | Ingredient |
| --- | --- |
| 31.59 | Polyoxypropylene diol having a molecular weight of 2000 (PPG 2000) |
| 51.61 | 400 Mesh silica |
| 15.77 | 54 Mesh silica |
| 0.72 | Titanium dioxide |
| 0.072 | Molecular sieves ("Linde" type 4A) |
| 0.10 | 2.6-di(t-butyl)-4-methyl phenol antioxidant available under the trade designation "Ionol" from the Shell Chemical Com. |
| 0.145 | Phenyl mercuric acetate catalyst |

The composition contained about 0.03 hydroxyl equivalents of oligomeric diol per 100 parts of mixture. Portions of the stock mixture were blended with portions of "PECH 1000" (a polyepichlorohydrin diol having a molecular weight of 1000), "TP 440" (a poly(oxypropylene)triol derived from trimethylolpropane and having a molecular weight of about 440) and additional phenyl mercuric acetate to provide a series of compositions containing a total of 1.0 hydroxyl equivalent of which oligomeric diol concentrations varied from 0.15 to 1.0 equivalents, PECH diol concentrations varied from 0 to 0.5 equivalents, and TP 440 triol concentrations varied from 0 to 0.5 equivalents and a total of 0.93 parts of phenyl mercuric acetate per hydroxyl equivalent. To each portion was added with mixing 1.27 isocyanate equivalents of "Mondur" MRS. Each mixture of the series was poured into a mold about 60 cm×1.9 cm×0.6 cm. The composition began to gel in about 3 to 5 minutes whereon they were placed into an oven at 110° C. for 20 minutes to cure. Following heating, the cured materials were allowed to cool. For testing, each was cut into two samples, A and B, of about 25 cm×1.9 cm and ground to a thickness of 0.6 cm. Samples A of each cured material were placed in a bath of oil made up of 90 parts "Red Owl" Brand vegetable cooking oil, 90 parts of "Planter's " Brand Peanut Oil, and 340 parts of "Wesson Oil" Brand vegetable cooking oil. Samples B of each cured material were placed in a bath of St. Paul, Minn. tap water. Both baths were maintained at 20° C. to 25° C. Shore A hardness was measured (in accordance with ASTM Procedure D 2240-68) and the length to ±25 micrometers (using a Starrett Micrometer Model No. 123 from L. S. Starrett Co., Athol, Mass.) of all samples before placing in the baths and at weekly intervals thereafter. Percent swell after each interval was calculated for each sample using the formula $$\% \text{ Swell} = \frac{L_i - L_t}{L_i} \times 100$$

where $L_i$ and $L_t$ are the lengths, respectively, of the sample initially and after treatment in the baths.

Table I presents initial hardness and hardness and percent swell after 158 days for all samples in both baths.

hardnesses that decrease less than 30% on immersion in water for 158 days. Also, although data is meager, it is to be observed that at less than about 50% triol, water swell is less than about 2%.

Similar results are to be obtained when PECH 1000 is replaced by equivalent amounts of PECH 500 and PECH 2000 (poly(epichlorohydrin)) diols having weight average molecular weights of 500 and 1000, respectively).

EXAMPLE 30

A polyurethane was prepared using the same proportions of components as used in Example 19 with the exception that the silica filler was treated with γ-aminopropyltriethoxysilane as coupling agent at a concentration of about 0.5% by weight based on the weight of filler. After 8 weeks in a water bath, the polyurethane had swelled 0.4% and in cooking oil 0.0%. The corresponding samples in which the silica had not been treated with coupling agent had swelled 0.9% in water.

What is claimed is:

1. A polyurethane resin which is substantially non-swelling when contacted with oil or water, said composition comprising the reaction product of:
    (1) organic polyisocyanate, and
    (2) a polyol composition comprising:
        (a) hydroxyl-terminated poly(haloalkylene ether) having a number average molecular weight of about 500 to 5000; and
        (b) hydroxyl-terminated halogen-free aliphatic compound having a number average molecular weight of about 32 to 6000,
    wherein
        the hydroxyl equivalents in said hydroxyl-terminated compounds and the isocyanate equivalents in the

TABLE I

| | RELATIVE HYDROXYL EQUIVALENTS | | | INITIAL HARDNESS | AFTER 158 DAYS IN | | | | |
|---|---|---|---|---|---|---|---|---|---|
| | | | | | COOKING OIL | | WATER | | |
| Ex. No. | DIOL (PECH 1000) | TRIOL (TP 400) | DIOL (PPG 2000) | Shore A | Shore A | % Swell | Shore A | % Change* | %Swell |
| 1 | 0.00 | 0.00 | 1.00 | 81 | 72 | 2.43 | 59 | (27) | 0.98 |
| 2 | 0.00 | 0.05 | 0.95 | 74 | 68 | 2.57 | 62 | (16) | 1.44 |
| 3 | 0.00 | 0.15 | 0.85 | 74 | 78 | 2.29 | 59 | (20) | 1.29 |
| 4 | 0.00 | 0.25 | 0.75 | 77 | 80 | 1.88 | 62 | (19) | 1.88 |
| 5 | 0.00 | 0.35 | 0.65 | 81 | 79 | 1.61 | 64 | (21) | 2.62 |
| 6 | 0.00 | 0.45 | 0.55 | 82 | 81 | 1.07 | 66 | (19) | 2.63 |
| 7 | 0.00 | 0.50 | 0.50 | 82 | 85 | 0.99 | 69 | (16) | 2.38 |
| 8 | 0.15 | 0.00 | 0.85 | 59 | 57 | 1.93 | 47 | (20) | 0.60 |
| 9 | 0.15 | 0.05 | 0.80 | 72 | 72 | 1.88 | 59 | (18) | 1.19 |
| 10 | 0.15 | 0.15 | 0.70 | 76 | 78 | 1.49 | 57 | (25) | 1.38 |
| 11 | 0.15 | 0.25 | 0.60 | 73 | 76 | 1.20 | 57 | (22) | 2.06 |
| 12 | 0.15 | 0.35 | 0.50 | 79 | 82 | 0.75 | 61 | (23) | 2.40 |
| 13 | 0.15 | 0.45 | 0.40 | 81 | 82 | 0.50 | 67 | (17) | 2.07 |
| 14 | 0.25 | 0.00 | 0.75 | 63 | 58 | 1.76 | 49 | (22) | 0.92 |
| 15 | 0.25 | 0.05 | 0.70 | 72 | 72 | 1.45 | 58 | (19) | 1.25 |
| 16 | 0.25 | 0.15 | 0.60 | 75 | 75 | 1.03 | 59 | (21) | 1.76 |
| 17 | 0.25 | 0.25 | 0.50 | 76 | 78 | 0.80 | 63 | (17) | 2.04 |
| 18 | 0.25 | 0.35 | 0.40 | 83 | 88 | 0.23 | 72 | (13) | 1.23 |
| 19 | 0.25 | 0.45 | 0.30 | 86 | 91 | 0.13 | 82 | (16) | 1.45 |
| 20 | 0.35 | 0.00 | 0.65 | 65 | 55 | 1.31 | 42 | (35) | 0.75 |
| 21 | 0.35 | 0.05 | 0.60 | 74 | 79 | 0.77 | 57 | (23) | 1.28 |
| 22 | 0.35 | 0.15 | 0.50 | 79 | 80 | 0.43 | 64 | (19) | 1.59 |
| 23 | 0.35 | 0.25 | 0.40 | 83 | 86 | 0.19 | 69 | (17) | 1.32 |
| 24 | 0.35 | 0.35 | 0.30 | 82 | 84 | 0.20 | 69 | (16) | 1.18 |
| 25 | 0.50 | 0.00 | 0.50 | 64 | 64 | 0.74 | 44 | (31) | 2.13 |
| 26 | 0.50 | 0.05 | 0.45 | 54 | 54 | 0.31 | 36 | (33) | 1.42 |
| 27 | 0.50 | 0.15 | 0.35 | 55 | 59 | 0.34 | 35 | (36) | 2.47 |
| 28 | 0.50 | 0.25 | 0.25 | 65 | 73 | 0.33 | 48 | (26) | 3.18 |
| 29 | 0.50 | 0.35 | 0.15 | 78 | 87 | 0.35 | 70 | (10) | 3.29 |

* $\frac{\text{Initial Shore A-Final Shore A}}{\text{Initial Shore A}} \times 100$ It is to be observed in Table I that for each concentration of poly(epichlorohydrin) diol (PECH 1000) used that, in general, with increase in triol (TP 440) concentration there was obtained a decrease in swell in cooking oil and an increase in water swell and at less than about 65%, 55% and 50%, non-halogen containing diol oil swell was less than about 1%, 0.5% and 0.2% respectively, of oil swell. It is also to be observed (see Examples 26 and 27) that the Shore A hardness of polyurethanes prepared from polyols having 50% hydroxyl equivalency of PECH diol decreases more than 30% while polyurethanes prepared from polyols having less than 50% hydroxyl equivalency from PECH diol have organic polyisocyanate provide an NCO:OH ratio of from about 0.8:1 to about 1.4:1;

said hydroxyl-terminated poly(haloalkylene ether) provides 5 to 40% of the total hydroxyl equivalents and said hydroxyl-terminated halogen-free aliphatic compound provides correspondingly 95 to 60% of the total hydroxyl equivalents;

5 to 75% of the total hydroxyl equivalents of said hydroxyl-terminated compounds have 3 to 6 hydroxyl groups and 10 to 90% of the hydroxyl groups present in said hydroxyl-terminated compounds have 1 or 2 hydroxyl groups of which no more than 25% have only 1 hydroxyl group; and at least 25% by weight of the hydroxyl-containing compounds have a molecular weight of at least 500.

2. The polyurethane resin of claim 1 wherein said poly(haloalkylene ether) compound has halogen substituents selected from the group consisting of fluorine, bromine and chlorine.

3. The polyurethane resin of claim 1 wherein said poly(haloalkylene ether) compound comprises the reaction product of epichlorodihydrin with an aliphatic hydroxy compound selected from the group consisting of ethylene glycol and glycerine.

4. The polyurethane resin of claim 1 wherein said polyol composition is represented by the area defined in DEIK in the FIG. of the drawing.

5. The polyurethane resin of claim 4 wherein said polyol composition lies in the area defined by DEHJK.

6. The polyurethane resin of claim 4 wherein said polyol composition is the area defined by DEGK.

7. The polyurethane resin of claim 4 wherein said polyol composition lies in the area defined by DEFL.

8. The polyurethane resin of claim 4 wherein said polyol composition lies in the area defined by LDM.

9. The composition of claim 1 wherein said polyurethane resin is in the form of a sheet-like material suited for use as a floor covering.

10. The polyurethane composition of claim 1 wherein said polyurethane resin is in the form of a gasket.

11. The polyurethane composition of claim 1 wherein there is filler also included in said composition.

12. The polyurethane composition of claim 1 wherein there is coupling agent also included in said composition.

13. A polyol composition suitable for reaction with polyisocyanate to form a polyurethane resin which is substantially resistant to swelling when contacted with oil and water comprising:

(1) hydroxyl-terminated poly(haloalkylene ether) having a number average molecular weight of about 500 to 5000 and (2) hydroxyl-terminated halogen-free aliphatic compound having a number average molecular weight of about 32 to 6000, wherein said hydroxyl-terminated poly(haloalkylene ether) provides 5 to 40% of the total hydroxyl equivalents and said hydroxyl-terminated halogen-free aliphatic compound provides correspondingly 95 to 60% of the total hydroxyl equivalents;

5 to 75% of the total hydroxyl equivalents of said hydroxyl-terminated compounds have 3 to 6 hydroxyl groups and 10 to 90% of the hydroxyl groups present in said hydroxyl-terminated compounds have 1 or 2 hydroxyl groups of which no more than 25% have only 1 hydroxyl group; and at least 25% by weight of the hydroxyl-containing compounds have a molecular weight of at least 500.

14. The polyol composition of claim 13 wherein said poly(haloalkylene ether) compound has halogen substituents selected from the group consisting of fluorine, bromine, and chlorine.

15. The polyol composition of claim 13 wherein said poly(haloalkylene ether) compound comprises the reaction product of epichlorodihydrin with an aliphatic hydroxy compound selected from the group consisting of ethylene glycol and glycerine.

16. The polyol composition of claim 13 wherein said polyol composition is represented by the area defined in DEIK in the FIGURE of the drawing.

17. The polyol composition of claim 13 wherein said polyol composition lies in the area defined by DEHJK.

18. The polyol composition of claim 3 wherein said polyol composition is the area defined by DEGK.

19. The polyol composition of claim 13 wherein said polyol composition is the area defined by DEFL.

20. The polyol composition of claim 13 wherein said polyol composition is the area defined by LDM.

* * * * *